(12) United States Patent
Seto

(10) Patent No.: US 11,766,842 B2
(45) Date of Patent: Sep. 26, 2023

(54) METHOD FOR MANUFACTURING PNEUMATIC TIRE AND PNEUMATIC TIRE

(71) Applicant: The Yokohama Rubber Co., LTD., Tokyo (JP)

(72) Inventor: Hideki Seto, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 437 days.

(21) Appl. No.: 16/482,224

(22) PCT Filed: Jan. 15, 2018

(86) PCT No.: PCT/JP2018/000834
§ 371 (c)(1),
(2) Date: Jul. 30, 2019

(87) PCT Pub. No.: WO2018/142901
PCT Pub. Date: Aug. 9, 2018

(65) Prior Publication Data
US 2020/0039160 A1 Feb. 6, 2020

(30) Foreign Application Priority Data
Jan. 31, 2017 (JP) .................................. 2017-016019

(51) Int. Cl.
*B29D 30/06* (2006.01)
*B60C 5/14* (2006.01)

(52) U.S. Cl.
CPC ............ *B29D 30/0681* (2013.01); *B60C 5/14* (2013.01); *B29D 2030/0682* (2013.01); *B60C 2005/145* (2013.01); *B60C 2005/147* (2013.01)

(58) Field of Classification Search
CPC .................. B60C 2005/147; B29D 2030/0682
See application file for complete search history.

(56) References Cited

U.S. PATENT DOCUMENTS

2010/0126647 A1   5/2010  Hashimura et al.
2010/0181000 A1*  7/2010  Takahashi ................. B60C 9/14
                                                  156/134

(Continued)

FOREIGN PATENT DOCUMENTS

JP    H11-005261         1/1999
JP    2001232696 A  *    8/2001    ......... B29D 30/0681

(Continued)

OTHER PUBLICATIONS

ESpaceNet Translation of JPH115261 (Year: 2021).*
ESpaceNet Translation of JP2001232696 (Year: 2022).*
ESpaceNet Translation of JP2008126437 (Year: 2022).*
ESpaceNet Translation of JP2013256287 (Year: 2022).*

(Continued)

*Primary Examiner* — Robert C Dye
*Assistant Examiner* — Alexander D Booth
(74) *Attorney, Agent, or Firm* — THORPE NORTH & WESTERN

(57) ABSTRACT

In a method for manufacturing a pneumatic tire, a laminated body is formed of a film containing a thermoplastic resin or elastomer, and rubber sheets laminated on surfaces of the film. A winding starting end of the inner rubber sheet is on a side opposite to a winding direction of the laminated body with respect to an end of the film; an end of the outer rubber sheet at the winding starting end is at the same position as the end of the film or is positioned on a side of the winding direction of the laminated body with respect to the end of the film. An outer surface of the outer rubber sheet at the winding starting end and an inner surface of the inner rubber sheet of a winding finishing end are brought into contact by overlapping and bonding the winding starting end and the winding finishing end.

6 Claims, 3 Drawing Sheets

(56) References Cited

U.S. PATENT DOCUMENTS

| | | | | |
|---|---|---|---|---|
| 2011/0265937 | A1* | 11/2011 | Hashimura | B29D 30/3007 156/123 |
| 2013/0276971 | A1* | 10/2013 | Seto | B29C 66/43 156/256 |
| 2014/0124114 | A1* | 5/2014 | Hayashi | B60C 5/14 264/173.16 |
| 2015/0290890 | A1* | 10/2015 | Hara | B60C 9/02 156/123 |
| 2015/0321433 | A1* | 11/2015 | Seto | B26F 3/08 156/123 |
| 2016/0016432 | A1 | 1/2016 | Hashimura et al. | |
| 2017/0239992 | A1 | 8/2017 | Mita | |
| 2017/0355228 | A1* | 12/2017 | Sakairi | B29D 30/0681 |
| 2018/0009184 | A1 | 1/2018 | Mita | |

FOREIGN PATENT DOCUMENTS

| | | | | |
|---|---|---|---|---|
| JP | 2008126437 A | * | 6/2008 | |
| JP | 2012-056454 | | 3/2012 | |
| JP | 2013256287 A | * | 12/2013 | B29D 30/3007 |
| JP | 2015-123935 | | 7/2015 | |
| JP | 2016-130083 | | 7/2016 | |
| WO | WO 2008/029781 | | 3/2008 | |
| WO | WO 2016/060128 | | 4/2016 | |
| WO | WO 2016/063785 | | 4/2016 | |
| WO | WO 2016/114229 | | 7/2016 | |

OTHER PUBLICATIONS

International Search Report for International Application No. PCT/JP2018/000834 dated Feb. 13, 2018, 4 pages, Japan.

* cited by examiner

METHOD FOR MANUFACTURING PNEUMATIC TIRE AND PNEUMATIC TIRE

TECHNICAL FIELD

The present technology relates to a method for manufacturing a pneumatic tire, which includes a splice process in which a tire component obtained by laminating rubber sheets on both sides of a film is wound on an outer circumference of a tire forming drum and both ends of the tire component are bonded to each other, and a pneumatic tire manufactured with the method. The film contains, as a main component, a thermoplastic resin or a thermoplastic elastomer composition containing a mixture of a thermoplastic resin and an elastomer. The present technology also relates to a method for manufacturing a pneumatic tire and a pneumatic tire, which suppress a tire failure caused by a splice portion at which the both ends of the tire component are bonded.

BACKGROUND ART

In recent years, it has been proposed that a film, which contains, as a main component, a thermoplastic resin or a thermoplastic elastomer composition containing a mixture of a thermoplastic resin and an elastomer, is arranged on a tire innermost surface as an innerliner layer. As a method for using such film as an innerliner layer, for example, it is proposed that a laminated body, which is obtained by laminating rubber sheets on both sides of the above-mentioned film, is wound on an outer circumference of a tire forming drum and both ends thereof are bonded to each other. However, with this method, there arises a problem in that delamination between the film and the rubber sheets may be caused depending on an end structure of the laminated body or that a mold release agent, which is applied on a surface of the tire forming drum, is liable to be entangled.

With regard to such problem, in Japan Unexamined Patent Publication No. 2012-056454, for example, it is proposed to reinforce a splice portion by bonding a splice sheet onto a winding start end of a laminated body that is a starting point of delamination. In Japan Unexamined Patent Publication No. 2016-130083, it is proposed to process a laminated body itself so that a tip end of a film is covered with a rubber sheet as a laminated body. However, even with those methods, it cannot necessarily be said that a tire failure caused by the splice portion can be prevented sufficiently. Further, for example, there are problems in that the number of steps for the splice process in which the laminated body is wound on the outer circumference of the tire forming drum and both ends thereof are bonded is increased, and that it is difficult to manufacture the laminated body itself. Thus, further measures are required to be taken.

SUMMARY

The present technology provides a method for manufacturing a pneumatic tire and a pneumatic tire, which suppress a tire failure caused by a splice portion at which both ends of a tire component are bonded, the tire component being obtained by laminating rubber sheets on both surfaces of a film containing, as a main component, a thermoplastic resin or a thermoplastic elastomer composition containing a mixture of a thermoplastic resin and an elastomer.

A method for manufacturing a pneumatic tire includes a splice process of winding a laminated body around an outer circumference of a tire forming drum and bonding a winding starting end and a winding finishing end of the laminated body with each other. The laminated body has a trilayer structure including a film containing, as a main component, a thermoplastic resin or a thermoplastic elastomer composition containing a mixture of a thermoplastic resin and an elastomer, and a pair of rubber sheets laminated on both surfaces of the film. On the tire forming drum, the pair of rubber sheets includes an inner rubber sheet being a layer on a side of the tire forming drum with respect to the film and an outer rubber sheet being a layer arranged on a side opposite to the tire forming drum with respect to the film. An end of the inner rubber sheet at the winding starting end is positioned on a side opposite to a winding direction of the laminated body with respect to an end of the film, and an end of the outer rubber sheet at the winding starting end is at the same position as the end of the film or is positioned on a side of the winding direction of the laminated body with respect to the end of the film. An outer surface of the outer rubber sheet at the winding starting end and an inner surface of the inner rubber sheet at the winding finishing end are brought into contact with each other by overlapping and bonding the winding starting end and the winding finishing end of the laminated body with each other.

A pneumatic tire includes a tread portion, which extends in a tire circumferential direction and has an annular shape, a pair of sidewall portions arranged on both sides of the tread portion, and a pair of bead portions arranged inward of the pair of sidewall portions in a tire radial direction. The pneumatic tire includes a carcass layer mounted between the pair of bead portions and an innerliner layer arranged on a tire inner surface along the carcass layer. The innerliner layer has a structure in which both ends of a laminated body overlap with each other and are bonded. The laminated body has a trilayer structure including a film containing, as a main component, a thermoplastic resin or a thermoplastic elastomer composition containing a mixture of a thermoplastic resin and an elastomer, an inner rubber sheet laminated on a tire inner circumferential side of the film, and an outer rubber sheet laminated on a tire outer circumferential side of the film. A tip end of the film in the end of the laminated body positioned on the tire inner circumferential side at a bond portion of the laminated body is brought into contact with an inner surface of the inner rubber sheet at the end of the laminated body positioned on the tire outer circumferential side at the bond portion of the laminated body. The film in the end of the laminated body positioned on the tire inner circumferential side at the bond portion of the laminated body is covered with the inner rubber sheet in the end of the laminated body positioned on the tire inner circumferential side at the bond portion of the laminated body.

In the manufacturing method of an embodiment of the present technology, as described above, with the laminated body in which a positional relationship among the respective ends of the inner rubber sheet, the film, and the outer rubber sheet at the winding starting end is set as described above, the winding starting end and the winding finishing end of the laminated body overlap with each other to be bonded so that the outer surface of the outer rubber sheet at the winding starting end of the laminated body and the inner surface of the inner rubber sheet at the winding finishing end of the laminated body are brought into contact with each other. After vulcanization, the end of the film, which may be a starting point of delamination and the like, is covered with the end of the inner rubber sheet projecting with respect to the end of the film. With this, a tire failure caused by the splice portion can be suppressed. Further, as described above, in the pneumatic tire manufactured with this method, the tip end of the film in the end of the laminating body (that is, the winding starting end in the splice process) positioned on the tire inner circumferential side at the bond portion of the laminated body is brought into contact with the inner surface of the inner rubber sheet at the end of the laminated body (that is, the winding finishing end in the splice process) positioned on the tire outer circumferential side at the bond portion of the laminated body. The film in the end of the laminated body (that is, the winding starting end in the splice process) positioned on the tire inner circumferential side at the bond portion of the laminated body is covered with the inner rubber sheet in the end of the laminated body (that is the winding starting end in the splice process) positioned on the tire inner circumferential side at the bond portion of the laminated body. Thus, the end of the film being a starting point of delamination and the like is not exposed. Therefore, a tire failure caused by the splice portion can be suppressed.

In an embodiment of the present technology, it is preferred that the winding starting end includes an end surface being an inclination surface, so that the end of the inner rubber sheet at the winding starting end is positioned on the side opposite to the winding direction of the laminated body with respect to the end of the film, and the end of the outer rubber sheet at the winding starting end is positioned on the side of the winding direction of the laminated body with respect to the end of the film. With this, the above-mentioned positional relationship of the ends of the film and the rubber sheets can be obtained with a method of, for example, cutting the winding starting end of the laminated body obliquely, and an effect of suppressing a tire failure caused by the splice portion can be exerted in a simple manner.

As described above, when the end surface of the winding starting end is an inclination surface, it is preferred to form the inclination surface of the winding starting end by cutting the end of the laminated body with a blade having a temperature of 100° C. or higher before being wound by the tire forming drum. With this, the inclination surface (cut surface) can be formed in a fine appearance, and after vulcanization, the end of the film can be covered securely with the end of the inner rubber sheet. Thus, it is advantageous in suppressing a tire failure caused by the splice portion.

In an embodiment of the present technology, it is preferred that an angle formed by a straight line, which connects the end of the inner rubber sheet at the winding starting end to the end of the outer rubber sheet at the winding starting end, with respect to a direction perpendicular to an outer surface of the tire forming drum is from 20° to 70°. By setting the angle as described above, the end of the inner rubber sheet easily covers the end of the film after vulcanization, and it is advantageous in suppressing a tire failure caused by the splice portion.

In an embodiment of the present technology, it is preferred that an end of the outer rubber sheet at the winding finishing end is positioned on the side of the winding direction of the laminated body with respect to the end of the film, and that an end of the inner rubber sheet at the winding finishing end is at the same position as the end of the film or is positioned on the side opposite to the winding direction of the laminated body with respect to the end of the film. As described above, the winding finishing end has the similar end structure of the winding starting end. With this, after vulcanization, at the winding finishing end, the end of the film is covered with the end of the outer rubber sheet projecting with respect to the end of the film, and the ends of the film are not exposed at both the winding starting end and the winding finishing end. Thus, it is advantageous in suppressing a tire failure caused by the splice portion.

As described above, when the winding finishing end has the similar end structure of the winding starting end, it is preferred that the winding finishing end includes an end surface being an inclination surface, so that the end of the outer rubber sheet at the winding finishing end is positioned on the side of the winding direction of the laminated body with respect to the end of the film, and the end of the inner rubber sheet at the winding finishing end is positioned on the side opposite to the winding direction of the laminated body with respect to the end of the film. With this, similarly to the case of the winding starting end, at the winding finishing end of the laminated body, the above-mentioned positional relationship of the respective ends of the film and the rubber sheets can be easily obtained, and an effect of suppressing a tire failure caused by the splice portion can be exerted in a simple manner.

As described above, when the end surface of the winding finishing end is an inclination surface, it is preferred to form the inclination surface of the winding finishing end by cutting the end of the laminated body with a blade having a temperature of 100° C. or higher before being wound by the tire forming drum. With this, similarly to the case of the winding starting end, the inclination surface (cut surface) can be formed in a fine appearance, and after vulcanization, the end of the film can be covered securely with the end of the outer rubber sheet. Thus, it is advantageous in suppressing a tire failure caused by the splice portion.

As described above, when the winding finishing end also has the same end structure as the winding starting end, it is preferred that an angle formed by a straight line, which connects the end of the inner rubber sheet at the winding finishing end to the end of the outer rubber sheet at the winding finishing end, with respect to a direction perpendicular to the outer surface of the tire forming drum is from 20° to 70°. As described above, similarly to the case of the winding starting end, by setting the angle as described above, the end of the outer rubber sheet easily covers the end of the film after vulcanization, and it is advantageous in suppressing a tire failure caused by the splice portion.

In an embodiment of the present technology, it is preferred that a length of a portion in which the outer surface of the outer rubber sheet at the winding starting end and the inner surface of the inner rubber sheet at the winding finishing end are brought into contact with each other is from 5 mm to 20 mm. As described above, by setting the length of the portion in which the winding starting end and the winding finishing end overlap with each other within an appropriate range, delamination of the winding starting end and the winding finishing end can be prevented while avoiding increase in tire weight and degradation in uniformity. Thus, it is advantageous in suppressing a tire failure caused by the splice portion.

In an embodiment of the present technology, it is preferred that the film contains nylon. With this, flexibility of the film is improved to suppress peeling of the film, and it is advantageous in suppressing a tire failure caused by the splice portion.

In an embodiment of the present technology, it is preferred that the film has a thickness from 0.03 mm to 0.15 mm. As described above, by setting the thickness of the film within an appropriate range, peeling of the film at the time of formation can be suppressed, and it is advantageous in suppressing a tire failure caused by the splice portion.

In an embodiment of the present technology, it is preferred that each of the pair of rubber sheets has a thickness from 0.2 mm to 1.0 mm. As described above, by setting the thickness of the rubber sheets within an appropriate range, the formation of an excessively high step by overlapping the winding starting end and the winding finishing end in the splice portion can be prevented, and entry of air into the step and degradation of uniformity caused by the step can be avoided.

In an embodiment of the present technology, it is preferred that a process of compression bonding the winding starting end and the winding finishing end overlapping with each other is included between the splice process and a vulcanization process. With this, delamination at the splice portion can be prevented more securely, and it is advantageous in suppressing a tire failure caused by the splice portion.

In an embodiment of the present technology, it is preferred that the laminated body is an unvulcanized innerliner layer. That is, the method for manufacturing a pneumatic tire according to an embodiment of the present technology can be used suitably for manufacturing a pneumatic tire using the film, which contains, as a main component, a thermoplastic resin or a thermoplastic elastomer composition containing a mixture of a thermoplastic resin and an elastomer, as an innerliner layer for the purpose of weight reduction and the like.

DETAILED DESCRIPTION

Configurations of embodiments of the present technology are described in detail below with reference to the accompanying drawings.

Figure 1:
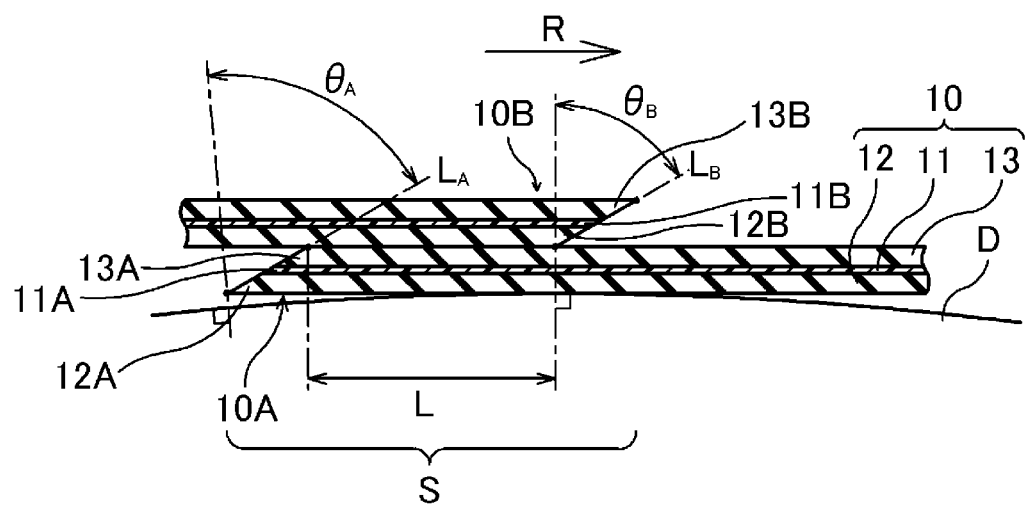
FIG. 1 is an explanatory view schematically illustrating an example of a splice portion of a laminated body (innerliner layer) to which a manufacturing method of an embodiment of the present technology is applied.
Figure 2:
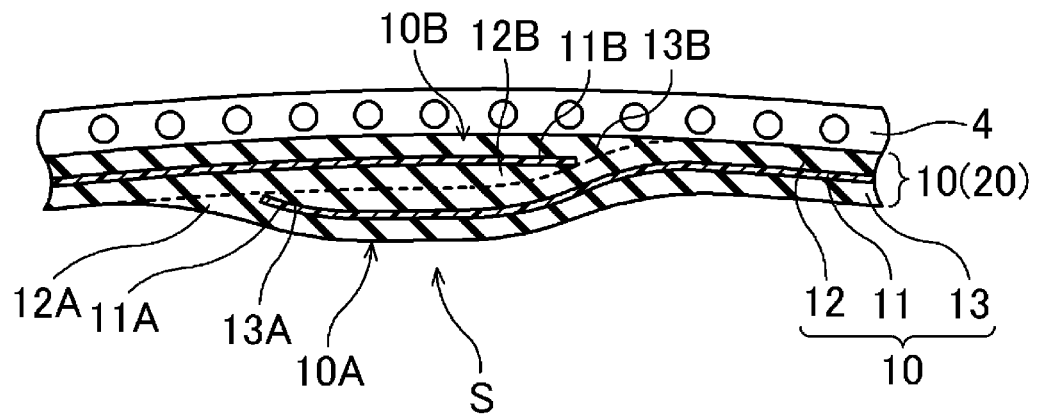
FIG. 2 is an explanatory view schematically illustrating a state of the splice portion of FIG. 1 after vulcanization.

As illustrated in FIGS. 1-2, a method for manufacturing a pneumatic tire according to an embodiment of the present technology includes a splice process in which a tire component (unvulcanized innerliner layer 20 having a laminated structure described below in the illustrated example) is wound on an outer circumference of a tire forming drum D and is formed into a cylindrical shape by bonding a winding starting end 10A and a winding finishing end 10B. In the manufacturing method of an embodiment of the present technology, processes other than the splice process are not particularly limited, and general methods may be employed. For example, as illustrated, on an outer circumferential side of the tire component (innerliner layer 20) wound around the outer circumference of the tire forming drum D, other tire components (not illustrated) including a carcass layer are further bonded sequentially to form a cylindrical primary formed body, and the primary formed body is increased in diameter and compression bonded on an inner side of a tread ring including a belt layer and a belt cover layer. With this, a green tire having a toroidal shape is formed, and thereafter, the green tire is put into a die and subjected to vulcanization.

The tire component to which the manufacturing method of an embodiment of the present technology is applied is a laminated body 10 having a trilayer structure formed of a film 11 and a pair of rubber sheets 12, 13 laminated on both sides of the film. The film 11 contains, as a main component, a thermoplastic resin or a thermoplastic elastomer composition containing a mixture of a thermoplastic resin and an elastomer. In the following description, of the pair of rubber sheets 12, 13, a layer arranged on the tire forming drum D side with respect to the film 11 on the tire forming drum D is an inner rubber sheet 12, and a layer arranged on a side opposite to the tire forming drum D with respect to the film 11 is an outer rubber sheet 13. The present technology can be applied to any layer other than the innerliner layer 20 as illustrated as long as the laminated body 10 has this structure. However, as the innerliner layer 20, the film 11 containing, as a main component, a thermoplastic resin or a thermoplastic elastomer composition containing a mixture of a thermoplastic resin and an elastomer is used in some cases. Thus, the manufacturing method of an embodiment of the present technology can be suitably applied to the innerliner layer 20 in particular.

In the manufacturing method of an embodiment of the present technology, the laminated body 10 is wound in the arrow direction in the figure (winding direction R) on the tire forming drum D, and the winding starting end 10A and the winding finishing end 10B are bonded as described above. In the following, the portion at which the winding starting end 10A and the winding finishing end 10B are bonded is referred to as a splice portion S. In this case, in the example of FIG. 1, an end surface of the winding starting end 10A forms an inclination surface, and an end 12A of the inner rubber sheet 12 at the winding starting end 10A is positioned on a side opposite to the winding direction R of the laminated body 10 with respect to an end 11A of the film 11. An end 13A of the outer rubber sheet 13 at the winding starting end 10A is positioned on a side of the winding direction R of the laminated body 10 with respect to the end 11A of the film 11. Further, the winding starting end 10A and the winding finishing end 10B of the laminated body 10 overlap with each other to be bonded so that an outer surface of the outer rubber sheet 13 at the winding starting end 10A and an inner surface of the inner rubber sheet 12 at the winding finishing end 10B of the laminated body 10 are brought into contact with each other.

As described above, with the laminated body 10 in which a positional relationship among the respective ends of the inner rubber sheet 12, the film 11, and the outer rubber sheet 13 at the winding starting end 10A is set as described above, the winding starting end 10A and the winding finishing end 10B of the laminated body 10 overlap with each other to be bonded so that the outer surface of the outer rubber sheet 13 at the winding starting end 10A of the laminated body 10 and the inner surface of the inner rubber sheet 12 at the winding finishing end 10B of the laminated body 10 are brought into contact with each other. After vulcanization, as illustrated in FIG. 2, the end 11A of the film 11, which may be a starting point of delamination and the like, is covered with a portion corresponding to the end 12A of the inner rubber sheet 12 projecting with respect to the end 11A of the film 11. With this, a tire failure caused by the splice portion S can be suppressed. Note that, in FIG. 2, the innerliner layer 20 is assumed as the laminated body 10, and thus a carcass layer 4 is present on the outer circumferential side of the laminated body 10 (innerliner layer 20).

Figure 3:
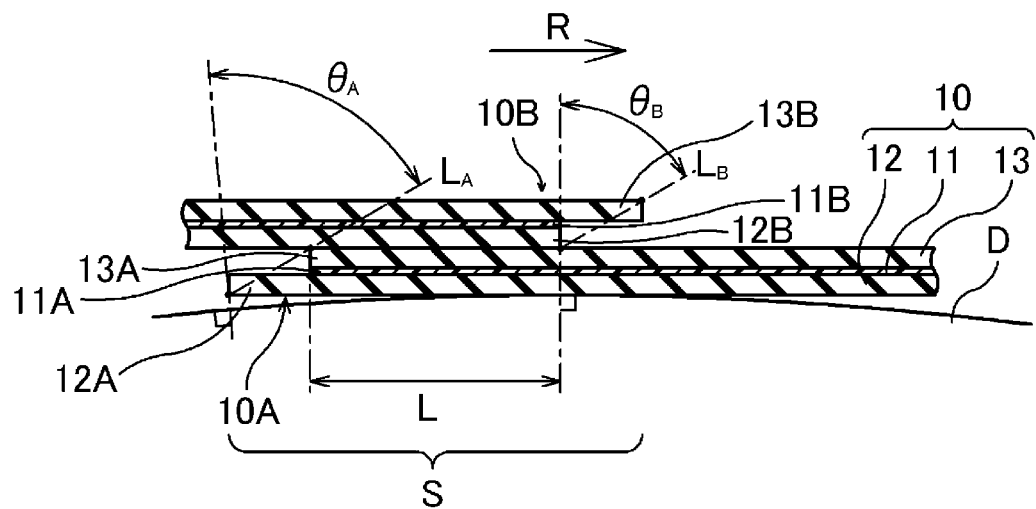
FIG. 3 is an explanatory view schematically illustrating another example of the splice portion of the laminated body (innerliner layer) to which the manufacturing method of an embodiment of the present technology is applied.
Figure 4:
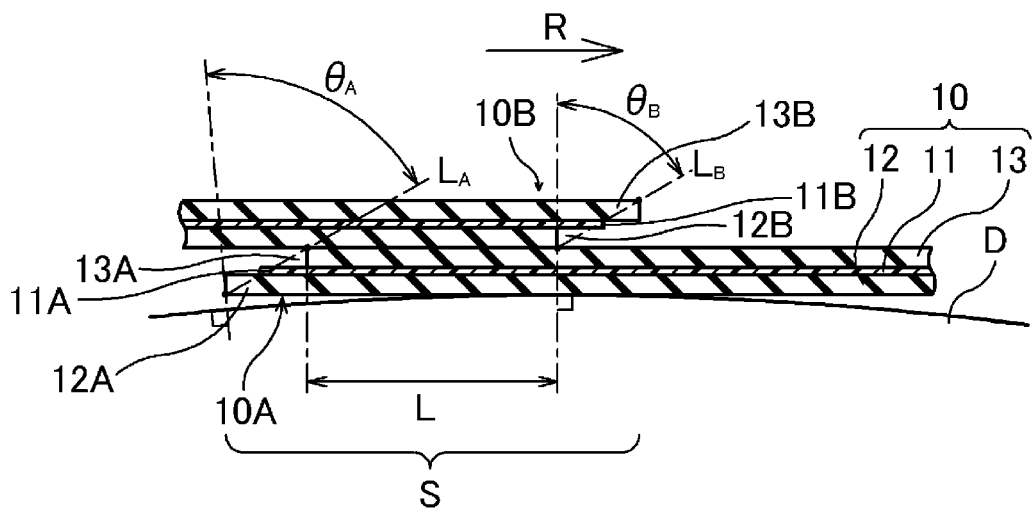
FIG. 4 is an explanatory view schematically illustrating another example of the splice portion of the laminated body (innerliner layer) to which the manufacturing method of an embodiment of the present technology is applied.

When the above-mentioned positional relationship among the respective ends of the inner rubber sheet 12, the film 11, and the outer rubber sheet 13 at the winding starting end 10A of the laminated body 10 is satisfied, the end surface of the winding starting end 10A is not required to be the inclination surface as in FIG. 1. For example, as illustrated in FIGS. 3 and 4, the winding starting end 10A may have a step-like structure in which the ends of the layers (the inner rubber sheet 12, the film 11, and the outer rubber sheet 13) are shifted from one another. Note that, in the example of FIG. 3, the end 12A of the inner rubber sheet 12 at the winding starting end 10A is positioned on the side opposite to the winding direction R of the laminated body 10 with respect to the end 11A of the film 11, and the end 13A of the outer rubber sheet 13 at the winding starting end 10A is present at the same position as the end 11A of the film 11. In the example of FIG. 4, the end 12A of the inner rubber sheet 12 at the winding starting end 10A is positioned on the side opposite to the winding direction R of the laminated body 10 with respect to the end 11A of the film 11, and the end 13A of the outer rubber sheet 13 at the winding starting end 10A is positioned on the side of the winding direction R of the laminated body 10 with respect to the end 11A of the film 11. Even in the states as in FIGS. 3 and 4, after vulcanization, the end 11A of the film 11, which may be a starting point of delamination and the like, is covered with the portion corresponding to the end 12A of the inner rubber sheet 12 projecting with respect to the end 11A of the film 11 as illustrated in FIG. 2. With this, a tire failure caused by the splice portion S can be suppressed.

In any case, as long as the end 12A of the inner rubber sheet 12 at the winding starting end 10A of the laminated body 10 is positioned on the side opposite to the winding direction R of the laminated body 10 with respect to the end 11A of the film 11, and the end 13A of the outer rubber sheet 13 at the winding starting end 10A of the laminated body 10 is present at the same position as the end 11A of the film 11 or is positioned on the side of the winding direction R of the laminated body 10 with respect to the end 11A of the film 11, the end 11A of the film 11 is covered after vulcanization. In the above-mentioned configuration, in consideration of ease of manufacturing of the laminated body 10, as illustrated in FIG. 1, it is preferred that the end surface of the winding starting end 10A of the laminated body 10 is an inclination surface. That is, with a simple method of, for example, cutting the winding starting end 10A of the laminated body 10 in an oblique manner, the respective ends of the film 11, and the rubber sheets 12, 13 can be set in the above-mentioned positional relationship. In particular, it is preferred to form the inclination surface of the winding starting end 10A by cutting the end of the laminated body 10 with a blade having a temperature of 100° C. or higher before being wound by the tire forming drum D. With this, the inclination surface (cut surface) can be formed in a fine appearance, and after vulcanization, the end 11A of the film 11 can be covered securely with the end 12A of the inner rubber sheet 12. Thus, it is advantageous in suppressing a tire failure caused by the splice portion S.

As illustrated in FIG. 1, the end surface of the winding starting end 10A of the laminated body 10 is an inclination surface, an angle $\theta_A$ formed by a straight line $L_A$, which connects the end 12A of the inner rubber sheet 12 at the winding starting end 10A to the end 13A of the outer rubber sheet 13 at the winding starting end 10A, with respect to a direction perpendicular to the outer surface of the tire forming drum D is preferably from 20° to 70°, more preferably, from 30° to 60°. By setting the angle $\theta_A$ as described above, the end 12A of the inner rubber sheet 12 easily covers the end 11A of the film 11 after vulcanization, and it is advantageous in suppressing a tire failure caused by the splice portion S. In this case, when the angle $\theta_A$ is less than 30°, the inclination surface is less likely to be contact with the winding finishing end 10B. Thus, it is difficult for the end 12A of the inner rubber sheet 12 to cover the end 11A of the film 11 sufficiently after vulcanization. When the angle $\theta_A$ is greater than 70°, each layer becomes thin, and parts with low rigidity are increased. Thus, rugosity is liable to be caused at the time of formation. Note that, as in FIGS. 3 and 4, when the end surface of the winding starting end 10A of the laminated body 10 has a step-like shape, it is also preferred that the angle $\theta_A$ formed by the straight line $L_A$, which connects the end 12A of the inner rubber sheet 12 at the winding starting end 10A (edge on the tire forming drum D side) to the end 13A of the outer rubber sheet 13 at the winding starting end 10A (edge on the winding finishing end 10B side), with respect to the direction perpendicular to the outer surface of the tire forming drum D falls within the above-mentioned range.

In the examples of FIGS. 1 to 4, the winding finishing end 10B of the laminated body 10 has the same structure as the winding starting end 10A. Specifically, in FIG. 1, an end surface of the winding finishing end 10B forms an inclination surface, and an end 13B of the outer rubber sheet 13 at a winding starting end 10B is positioned on a side of the winding direction R of the laminated body 10 with respect to an end 11B of the film 11, and an end 12B of the inner rubber sheet 12 at the winding finishing end 10B is positioned on a side opposite to the winding direction R of the laminated body 10 with respect to the end 11B of the film 11. In FIG. 3, the end surface of the winding finishing end 10B has a step-like structure in which the ends of the layers (the inner rubber sheet 12, the film 11, the outer rubber sheet 13) are shifted from one another. The end 13B of the outer rubber sheet 13 at the winding finishing end 10B is positioned on the side of the winding direction R of the laminated body 10 with respect to the end 11B of the film 11, and the end 12B of the inner rubber sheet 12 at the winding finishing end 10B is present at the same position as the end 11B of the film 11. In FIG. 4, the end surface of the winding finishing end 10B has a step-like structure in which the ends of the layers (the inner rubber sheet 12, the film 11, the outer rubber sheet 13) are shifted from one another. The end 13B of the outer rubber sheet 13 at the winding finishing end 10B is positioned on the side of the winding direction R of the laminated body 10 with respect to the end 11B of the film 11, and the end 12B of the inner rubber sheet 12 at the winding finishing end 10B is positioned on the side opposite to the winding direction R of the laminated body 10 with respect to the end 11B of the film 11.

As described above, also at the winding finishing end 10B, the end 13B of the outer rubber sheet 13 is positioned on the side of the winding direction R of the laminated body 10 with respect to the end 11B of the film 11, and the end 12B of the inner rubber sheet 12 at the winding finishing end 10B is present at the same position as the end 11B of the film 11 or is positioned on the side opposite to the winding direction R of the laminated body 10 with respect to the end 11B of the film 11. With this, as illustrated in FIG. 2, also at the winding finishing end 10B, the end 13B of the outer rubber sheet 13, which projects with respect to the end 11B of the film 11, covers the end 11B of the film 11 after vulcanization. That is, both the winding starting end 10A and the winding finishing end 10B have the above-mentioned structure. With this, at both the winding starting end 10A and the winding finishing end 10B, the ends 11A, 11B of the film 11 are not exposed. Thus, it is advantageous in suppressing a tire failure caused by the splice portion S.

Also, in the case where the winding finishing end 10B employs the above-mentioned end structure, it is preferred that the end surface as in FIG. 1 is an inclination surface as the winding starting end 10A from the perspective of manufacturability. That is, with this structure, similarly to the winding starting end 10A, the inclination surface of the winding finishing end 10B can be formed by cutting the end of the laminated body 10 with a blade having a temperature of 100° C. or higher before being wound by the tire forming drum D. The inclination surface (cut surface) can be formed in a fine appearance.

Further, also in the case where the winding finishing end 10B employs the above-mentioned end structure, an angle $\theta_B$ formed by a straight line $L_B$, which connects the end 12B of the inner rubber sheet 12 at the winding finishing end 10B the end 13B of the outer rubber sheet 13 at the winding finishing end 10B, with respect to the direction perpendicular to the outer surface of the tire forming drum D is preferably from 20° to 70°, more preferably, from 30° to 60°. By setting the angle $\theta_B$ as described above, the end 13B of the outer rubber sheet 13 easily covers the end 11B of the film 11 after vulcanization, and it is advantageous in suppressing a tire failure caused by the splice portion S. In this case, when the angle $\theta_B$ is less than 30°, the inclination surface is less likely to be contact with the winding finishing end 10B. Thus, it is difficult for the end 12B of the inner rubber sheet 12 to cover the end 11B of the film 11 sufficiently after vulcanization. When the angle $\theta_B$ is greater than 70°, the tip end of each layer becomes thin, and parts with low rigidity are increased. Thus, rugosity is liable to be caused at the time of formation. Note that, as in FIGS. 3 and 4, when the end surface of the winding finishing end 10B of the laminated body 10 has a step-like shape, it is also preferred that the angle $\theta_B$ formed by the straight line $L_B$, which connects the end 12B of the inner rubber sheet 12 at the winding finishing end 10B (edge on the winding starting end 10A) to the end 13B of the outer rubber sheet 13 at the winding finishing end 10B (edge on a side that is not contact with the film 11), with respect to the direction perpendicular to the outer surface of the tire forming drum D falls within the above-mentioned range.

Note that, as illustrated in FIG. 1, in the case where the winding starting end 10A of the laminated body 10 is the above-mentioned inclination surface, when the winding finishing end 10B is also the above-mentioned inclination surface, the cut surface constituting one of the pair, which is obtained by cutting the laminated body to form one of the winding starting end 10A and the winding finishing end 10B, has a shape of another one of the winding starting end 10A and the winding finishing end 10B. Thus, the laminated body 10 having the above-mentioned end structure can be manufactured easily. Further, as illustrated in FIG. 4, in the case where the winding starting end 10A of the laminated body 10 has the above-mentioned step-like shape, when the winding finishing end 10B also has the above-mentioned step-like shape, the respective layers have the same length, and the laminated body is formed by laminating the respective layers in a shifted manner as described above at one of the winding starting end 10A and the winding finishing end 10B. Along with this, the respective layers are laminated in a shifter manner as described above also at another one of the winding starting end 10A and the winding finishing end 10B. Thus, the laminated body 10 having the above-mentioned end structure can be manufactured easily.

The winding starting end 10A and the winding finishing end 10B overlap with each other as described above so that the outer surface of the outer rubber sheet 13 at the winding starting end 10A and the inner surface of the inner rubber sheet 12 at the winding finishing end 10B of the laminated body 10 are brought into contact with each other. In this state, it is preferred that a length L of the portion in which the outer surface of the outer rubber sheet 13 at the winding starting end 10A and the inner surface of the inner rubber sheet 12 at the winding finishing end 10B are brought into contact with each other is from 5 mm to 20 mm. As described above, by setting the length L of the portion in which the winding starting end 10A and the winding finishing end 10B overlap with each other within an appropriate range, delamination of the winding starting end 10A and the winding finishing end 10B can be prevented effectively while avoiding increase in tire weight and degradation in uniformity. Thus, it is advantageous in suppressing a tire failure caused by the splice portion S. When the length L is less than 5 mm, adhesiveness between the winding starting end 10A and the winding finishing end 10B is weaken, and delamination is liable to be caused. When the length L is greater than 20 mm, a used amount of the laminated body 10 is increased, and thus there may be a possibility of increase in tire weight and degradation of uniformity.

A thickness of the laminated body 10 can be set as appropriate in accordance with a structure of a pneumatic tire to which the present technology is applied and a tire component to which the present technology is applied. In particular, when the laminated body 10 is the innerliner layer 20, it is preferred that the thickness of the film 11 is from 0.03 mm to 0.15 mm. As described above, by setting the thickness of the film 11 within an appropriate range, peeling of the film 11 at the time of formation can be suppressed effectively, and it is advantageous in suppressing a tire failure caused by the splice portion S. When the thickness of the film 11 is less than 0.03 mm, rigidity of the film 11 itself is reduced, and rugosity is liable to be caused. When the thickness of the film 11 is greater than 0.15 mm, the film 11 is increased in thickness, and peeling is liable to be caused at the time of formation.

Further, it is preferred that each of the pair of rubber sheets 12, 13 has a thickness from 0.2 mm to 1.0 mm. As described above, by setting the thickness of the rubber sheets 12, 13 within an appropriate range, formation of an excessively high step by overlapping the winding starting end 10A and the winding finishing end 10B can be prevented in the splice portion S, and entry of air into the step and degradation of uniformity caused by the step can be avoided. When the thicknesses of the rubber sheets 12, 13 are less than 0.2 mm, rigidities of the rubber sheets 12, 13 themselves are reduced, and rugosity is liable to be caused. Further, when the rubber sheets 12, 13 are too thin, the thickness of the laminated body 10 as a whole is excessively small, and it is difficult to form the above-mentioned end structure. When the thicknesses of the rubber sheets 12, 13 are greater than 1.0 mm, the step formed by overlapping the winding starting end 10A and the winding finishing end 10B in the splice portion S is excessively high. It is concerned that a failure of air entry into the step is liable to be caused and the uniformity is degraded due to the step.

As described above, in an embodiment of the present technology, details of the processes other than the splice process are not particularly limited, and a general method may be employed at the time of manufacturing a pneumatic tire. However, it is preferred that a process of compression bonding the winding starting end 10A and the winding finishing end 10B overlapping with each other is included before the vulcanization process. With this, delamination at the splice portion S can be prevented more securely, and it is advantageous in suppressing a tire failure caused by the splice portion S.

As described above, the film 11 is the film 11 containing, as a main component, a thermoplastic resin or the film 11 containing, as a main component, a thermoplastic elastomer composition containing a mixture of a thermoplastic resin and an elastomer. Examples of thermoplastic resins that can be used in the film 11 include a polyamide resin (e.g., nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 9T, nylon 6/6T copolymer, nylon 66/PP copolymer, nylon 66/PPS copolymer) and an N-alkoxyalkyl compound thereof, e.g., a methoxymethyl nylon 6, a methoxymethyl nylon 6/610 copolymer, or a methoxymethyl nylon 612; a polyester resin (e.g., an aromatic polyester such as polybutylene terephthalate (PBT), polyethylene terephthalate (PET), polyethylene isophthalate (PEI), a PET/PEI copolymer, polyarylate (PAR), polybutylene naphthalate (PBN), a liquid crystal polyester, a polyoxyalkylene diimide acid/polybutylene terephthalate copolymer); a polynitrile resin (e.g., polyacrylonitrile (PAN), polymethacrylonitrile, an acrylonitrile/styrene copolymer (AS), a (meth)acrylonitrile/styrene copolymer, a (meth)acrylonitrile/styrene/butadiene copolymer), a polymethacrylate resin (e.g., polymethyl methacrylate (PMMA), polyethyl methacrylate), a polyvinyl resin (e.g., polyvinyl acetate, a polyvinyl alcohol (PVA), a vinyl alcohol/ethylene copolymer (EVOH), polyvinylidene chloride (PVDC), polyvinyl chloride (PVC), a vinyl chloride/vinylidene chloride copolymer, a vinylidene chloride/methylacrylate copolymer, a vinylidene chloride/acrylonitrile copolymer (ETFE)), a cellulose resin (e.g., cellulose acetate, cellulose acetate butyrate), a fluoride resin (e.g., polyvinylidene difluoride (PVDF), polyvinyl fluoride (PVF), polychlorofluoroethylene (PCTFE), a tetrafluoroethylene/ethylene copolymer), and an imide resin (e.g., an aromatic polyimide (PI)).

Of all, a polyamide resin (the above-mentioned kinds of nylon) is preferable from the perspective of physical properties, processability, ease of handling, and the like. That is, the film 11 containing nylon is excellent in flexibility, and peeling of the film at the time of formation can be suppressed effectively. Thus, it is advantageous in suppressing a tire failure caused by the splice portion S.

Further, the blended product of a thermoplastic resin and an elastomer (thermoplastic elastomer composition) that can form the film 11 has a structure in which the elastomer is dispensed as a discontinuous phase in the matrix of the thermoplastic resin. This structure provides forming processability equivalent to that of the thermoplastic resin. As the thermoplastic resin forming the thermoplastic elastomer composition, the above-mentioned thermoplastic resin can be used similarly to the case where the thermoplastic resin is used alone, and in particular, a polyamide resin (various kinds of nylon described above) can suitably be used. Examples of the elastomer constituting the thermoplastic elastomer composition that can be preferably used include a diene-based rubber or a hydrogenate thereof (e.g., a natural rubber (NR), an isoprene rubber (IR), an epoxidized natural rubber, a styrene-butadiene rubber (SBR), a butadiene rubber (BR, high cis-BR, and low cis-BR), a nitrile rubber (NBR), hydrogenated NBR, hydrogenated SBR), an olefin rubber (e.g., an ethylene propylene rubber (EPDM, EPM), a maleic acid modified ethylene propylene rubber (M-EPM), a butyl rubber (IIR), an isobutylene and aromatic vinyl or diene-based monomer copolymer, an acrylic rubber (ACM), an ionomer), a halogen-containing rubber (e.g., Br-IIR, CI-IIR, a brominated isobutylene-p-methylstyrene copolymer (BIMS), a chloroprene rubber (CR), a hydrin rubber (CHR), a chlorosulfonated polyethylene rubber (CSM), a chlorinated polyethylene rubber (CM), a chlorinated polyethylene rubber modified with maleic acid (M-CM)), a silicone rubber (e.g., a methyl vinyl silicone rubber, a dimethyl silicone rubber, a methylphenyl vinyl silicone rubber), a sulfur-containing rubber (e.g., a polysulfide rubber), a fluororubber (e.g., a vinylidene fluoride rubber, a vinyl ether rubber containing fluoride, a tetrafluoroethylene-propylene rubber, a silicon-based rubber containing fluoride, a phosphazene rubber containing fluoride), and a thermoplastic elastomer (e.g., a styrene elastomer, an olefin elastomer, an ester elastomer, a urethane elastomer, and a polyamide elastomer).

In particular, from the perspective of increasing a rubber volume ratio to improve flexibility and durability from a low temperature to a high temperature, it is preferred that 50 wt % or greater is a halogenated butyl rubber, a brominated isobutylene-paramethyl styrene copolymer rubber, or a maleic anhydride-modified ethylene α olefin copolymer rubber when a plurality of elastomers are blended. In addition, it is preferred that 50 wt % or greater of the thermoplastic resin in the thermoplastic elastomer composition is any one of nylon 11, nylon 12, nylon 6, nylon 66, a nylon 6/66 copolymer, a nylon 6/12 copolymer, a nylon 6/10 copolymer, a nylon 4/6 copolymer, a nylon 6/66/12 copolymer, aromatic nylon, or an ethylene/vinyl alcohol copolymer from the perspective of durability.

At the time of preparing the thermoplastic elastomer composition in combination of a specific thermoplastic resin and a specific elastomer described above, when the thermoplastic resin and the elastomer are incompatible, a compatibility agent may be used as a third component for compatibilization. By mixing the compatibility agent in the blend of the thermoplastic resin and the elastomer, interfacial tension between the thermoplastic resin and the elastomer is reduced, and as a result, the particle diameter of the elastomer that forms the dispersion phase becomes very small. Thus, the characteristics of both the components may be realized effectively. In general, such a compatibility agent has a copolymer structure of both or either one of the thermoplastic resin and the elastomer, or a copolymer structure having an epoxy group, a carbonyl group, a halogen group, an amino group, an oxazoline group, or a hydroxyl group, which is capable of reacting with the thermoplastic resin or the elastomer. While the type of compatibility agent may be selected according to the type of thermoplastic resin and elastomer to be blended, such a compatibility agent generally includes: a styrene/ethylene butylene block copolymer (SEBS) or a maleic acid modified compound thereof; an EPDM, EPM, EPDM/styrene or EPDM/acrylonitrile graft copolymer or a maleic acid modified compound thereof; a styrene/maleic acid copolymer, or a reactive phenoxy, and the like. The compounded content of such a compatibility agent is not particularly limited, but is preferably from 0.5 to 10 parts by weight with respect to 100 parts by weight of the polymer component (total of the thermoplastic resin and the elastomer).

In the thermoplastic elastomer composition, a composition ratio of the thermoplastic resin and the elastomer is not particularly limited. The composition ratio may be determined as appropriate so as to obtain a structure in which the elastomer is evenly dispensed as a discontinuous phase in the matrix of the thermoplastic resin, for example. The composition ratio of the thermoplastic resin and the elastomer is preferably, in a weight ratio of the thermoplastic resin/the elastomer, from 90/10 to 20/80, and more preferably, from 80/20 to 30/70.

In an embodiment of the present technology, a compatibility agent or other polymers may be blended with the thermoplastic resin or the thermoplastic elastomer composition obtained by blending the thermoplastic resin and the elastomer, within a range that does not impair the characteristics required for constituting the film 11, for example. The purposes of mixing another polymer are to improve the molding workability of the material, to improve the heat resistance, to reduce cost, and the like. Examples of the material used for the polymer include polyethylene (PE), polypropylene (PP), polystyrene (PS), acrylonitrile butadiene styrene (ABS), sodium bisulfite (SBS), and polycarbonate (PC). Further, a filler (calcium carbonate, titanium oxide, alumina, and the like), a reinforcing agent such as carbon black and white carbon, a softening agent, a plasticizer, a processing aid, a pigment, a dye, an anti-aging agent, or the like that are generally blended with polymer compounds may be optionally blended so long as the characteristics required for the film 11 are not impaired.

Further, the elastomer to be blended with the thermoplastic resin may be dynamically vulcanized when being mixed with the thermoplastic resin. A vulcanizing agent, a vulcanization aid, vulcanization conditions (temperature and time), and the like, during the dynamic vulcanization can be determined as appropriate in accordance with the composition of the elastomer to be added, and are not particularly limited. When the elastomer in the thermoplastic elastomer composition is dynamically vulcanized in this manner, the obtained thermoplastic elastomer composition contains the vulcanized elastomer. Thus, the thermoplastic elastomer composition has resistance (elasticity) against deformation from the outside, which is preferable in that the effect of the present technology can be enhanced.

A type of a rubber composition constituting the rubber sheets is not particularly limited, but is preferred to use diene rubber in order to secure adhesiveness to the adjacent tire component. As the diene rubber, natural rubber, butadiene rubber, styrene-butadiene rubber, and the like that are generally used for a pneumatic tire can be used.

Figure 5:
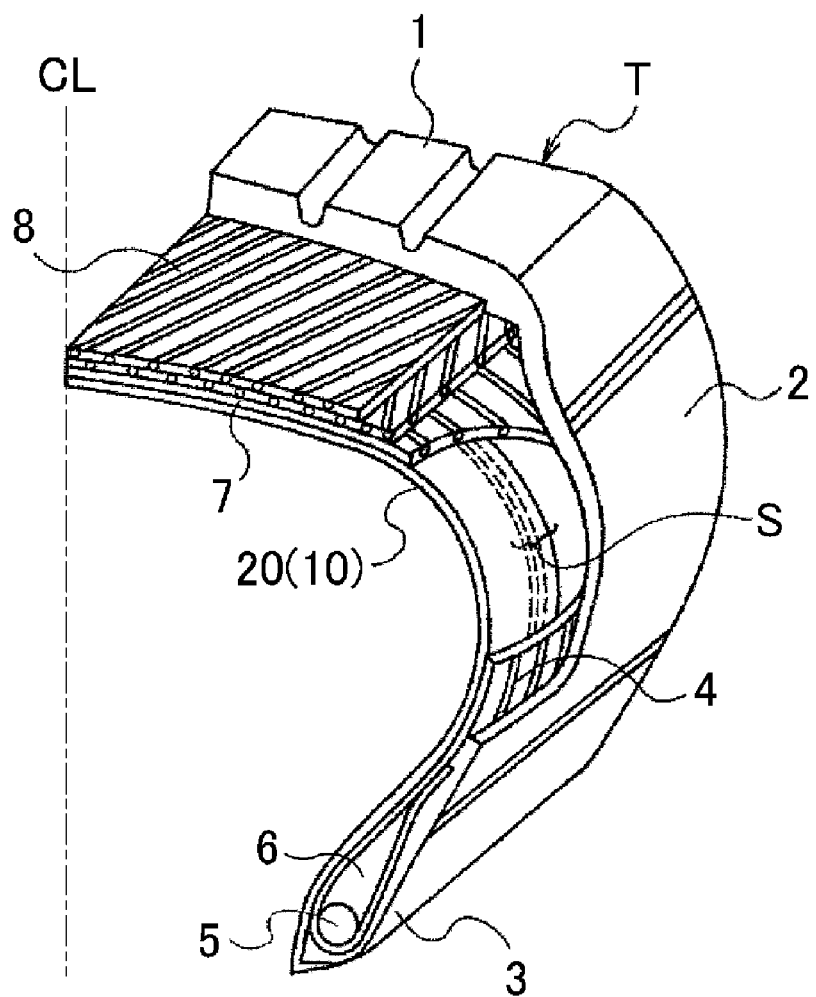
FIG. 5 is a partially-fragmented perspective view illustrating an example of a pneumatic tire that can be manufactured with the manufacturing method of an embodiment of the present technology.

The pneumatic tire manufactured with the above-mentioned method has a general structure except for the layer (for example, innerliner layer) of the tire component to which the above-mentioned manufacturing method is applied. That is, as illustrated in FIG. 5, the pneumatic tire manufactured with the method according to an embodiment of the present technology includes an annular tread portion 1 extending in the tire circumferential direction, a pair of sidewall portions 2 arranged on both sides of the tread portion 1, and a pair of bead portions 3 arranged inward of the sidewall portions 2 in the tire radial direction. Note that the reference sign "CL" in FIG. 5 denotes the tire equator.

A carcass layer 4 is mounted between the left-right pair of bead portions 3. The carcass layer 4 includes a plurality of reinforcing cords extending in the tire radial direction, and is folded back around a bead core 5 arranged in each of the bead portions 3 from a vehicle inner side to a vehicle outer side. Additionally, bead fillers 6 are arranged on the outer circumference of the bead cores 5, and each bead filler 6 is enveloped by a main body portion and a folded back portion of the carcass layer 4. In contrast, a plurality of belt layers 7, 8 (two layers in FIG. 5) are embedded on the outer circumferential side of the carcass layer 4 in the tread portion 1. The belt layers 7, 8 each include a plurality of reinforcing cords that are inclined with respect to the tire circumferential direction, with the reinforcing cords of the different layers arranged in a criss-cross manner. In the belt layers 7, 8, the inclination angle of the reinforcing cords with respect to the tire circumferential direction ranges from, for example, 10° to 40°. In addition, a belt reinforcing layer is provided on the outer circumferential side of the belt layers 7, 8. The belt reinforcing layer includes organic fiber cords oriented in the tire circumferential direction. In the belt reinforcing layer, the angle of the organic fiber cords with respect to the tire circumferential direction is set, for example, to from 0° to 5°. On the tire inner surface, the innerliner layer 20 manufactured with the above-mentioned method is provided. Due to the material (film 11), the innerliner layer 20 has an air permeation preventive performance, and prevents air filled in the tire from permeating to the outside of the tire.

As illustrated in FIG. 2, the layer (innerliner layer 20) of the tire component manufactured with the above-mentioned method has the following structure in the tire equator cross-section. That is, in the structure, both the ends of the laminated body overlap with each other to be bonded, the laminated body having a trilayer structure, which includes the film 11 containing, as a main component, a thermoplastic resin or a thermoplastic elastomer composition containing a mixture of a thermoplastic resin and an elastomer, the inner rubber sheet 12 laminated on the tire inner circumferential side of the film 11, and the outer rubber sheet 13 laminated on the tire outer circumferential side of the film 11 (side of the carcass layer 4). Further, in the portion in which both the ends are bonded (splice portion S), the tip end 11A of the film 11 in the end 10A of the laminated body 10 (corresponding to the above-mentioned winding starting end 10A) positioned on the tire inner circumferential side is brought into contact with the inner surface of the inner rubber sheet 12 at the end 10B of the laminated body 10 (corresponding to the above-mentioned winding finishing end 10B) positioned on the tire outer circumferential side, and the film 11 in the end 10A of the laminated body 10 (winding starting end 10A) positioned on the tire inner circumferential side is covered with the inner rubber sheet 12 in the end 10A of the laminated body 10 (winding starting end 10A) positioned on the tire inner circumferential side.

Note that, in the example of FIG. 2, at the time of manufacturing, the winding finishing end 10B also employs the above-mentioned end structure. In the portion in which both the ends are bonded (splice portion S), the tip end 11B of the film 11 in the end 10B of the laminated body 10 (corresponding to the above-mentioned winding finishing end 10B) positioned on the tire outer circumferential side is brought into contact with the outer surface of the outer rubber sheet 13 in the end 10A of the laminated body 10 (corresponding to the above-mentioned winding starting end 10A) positioned on the tire inner circumferential side, and the film 11 in the end 10B of the laminated body 10 (winding finishing end 10B) positioned on the tire outer circumferential side is covered with the outer rubber sheet 13 in the end 10B of the laminated body 10 (winding finishing end 10B) positioned on the tire outer circumferential side.

As described above, in the pneumatic tire manufactured with the manufacturing method of an embodiment of the present technology, the tire component (innerliner layer 20) formed of the laminated body 10 has the above-mentioned structure. Thus, the end 11A of the film 11 (the end 11A and the end 11B at the winding finishing end 10B in the case of employing the above-mentioned end structure), which may be a starting point of delamination and the like, is not exposed due to being covered by the rubber sheets 12, 13. With this, a tire failure caused by the splice portion S can be suppressed.

Examples

Fifty tires were manufactured for each of twelve types of pneumatic tires for Comparative Examples 1 and 2, and Examples 1 to 10. A state of a splice portion of each tire (presence/absence of flotation or rugosity in each layer) was evaluated, and results were shown in Table 3. In each pneumatic tire, a laminated body having a trilayer structure in which rubber sheets formed of a rubber composition having a composition shown in Table 2 were laminated on both surfaces of a film formed of a thermoplastic elastomer composition having a composition shown in Table 1, was used as an inner liner. As shown in Table 3, a thickness of the film, a thickness of the inner rubber sheet, a thickness of the outer rubber sheet, an end structure of the laminated body, an angle of a winding starting end, an angle of a winding finishing end, a length L of a portion in which an outer surface of the outer rubber sheet at the winding starting end and an inner surface of the inner rubber sheet at the winding finishing end are brought into contact with each other, and a method for forming an end surface differ for each of the twelve types of pneumatic tires. The evaluation results were given on a scale of 1 to 5 in accordance with the number of tires including the splice portion in a poor state (tire with flotation or rugosity in each layer). When the number of tires in a poor state was from zero to two, "5" was given. When the number of tires in a poor state was from three to five, "4" was given. When the number of tires in a poor state was from six to ten, "3" was given. When the number of tires in a poor state was eleven to twenty, "2" was given. When the number of tires in a poor state was twenty-one to fifty, "1" was given.

Note that, the angle at the winding starting end was indicated as a positive value when the end surface of the laminated body was inclined to a winding direction of the laminated body with respect to a line perpendicular to a drum surface with an end point of the inner rubber sheet as an apex. The angle at the winding starting end was indicated as a negative value when the end surface of the laminated body was inclined to a side opposite to the winding direction of the laminated body with respect to the line perpendicular to the drum surface. Further, the angle at the winding finishing end was indicated as a positive value when the end surface of the laminated body was inclined to a winding direction of the laminated body with respect to a line perpendicular to a drum surface with an end point of the inner rubber sheet as an apex. The angle at the winding finishing end was indicated as a negative value when the end surface of the laminated body was inclined to a side opposite to the winding direction of the laminated body with respect to the line perpendicular to the drum surface.

In the column of "End structure of laminated body" in Table 3, when the end surface of the laminated body was an inclination surface, "Inclination surface" was given; when the end surface of the laminated body was a step-like shape, "Step-like shape" was given; and when the end surface of the laminated body was perpendicular to the drum, "Vertical" was given. When a corresponding figure was given, a numeral for the figure was also given. In the column of "Method for forming end surface" in Table 3, when the end surface of the laminated body was an inclination surface, a method for forming the inclination surface was given. When cutting was performed with a cutter blade, "Cutter blade" was given, and a temperature of the cutter blade was also given. Note that, in Example 2, the ends of the layers which are the film, the inner rubber sheet, and the outer rubber sheet were cut perpendicularly in advance, and thereafter, the respective layers were shifted and bonded to obtain step-like ends. In this case, the column of "Method for forming end surface" in Table 3 was a blank.

TABLE 1

|  | Compounded content (parts by mass) |
| --- | --- |
| Br-IPMS | 100 |
| Modified EEA | 10 |
| N6/66 | 100 |
| Zinc oxide | 0.5 |
| Stearic acid | 0.2 |
| Zinc stearate | 1 |

The types of raw materials used as indicated in Table 1 are described below.
  Br-IPMS: Brominated isobutylene-p-methylstyrene copolymer, Exxpro 3035, available from ExxonMobil Chemical Company
  Modified EEA: Maleic anhydride-modified ethylene-ethylacrylate copolymer, HPR-AR201, available from Du Pont-Mitsui Polychemicals Co., Ltd.
  N6/66: nylon 6/66 copolymer, UBE Nylon 5033B, available from Ube Industries, Ltd.
  Zinc oxide: Zinc Oxide III, available from Seido Chemical Industry Co., Ltd.
  Stearic acid: industrial stearic acid N, available from Chiba Fatty Acid
  Zinc stearate: Zinc stearate, available from NOF Corporation

TABLE 2

|  | Compounded content (parts by mass) |
| --- | --- |
| SBR | 50 |
| NR | 50 |
| CB | 60 |
| Stearic acid | 1 |
| Aroma oil | 7 |
| Zinc oxide | 3 |
| Modified resorcin formaldehyde condensate | 2 |
| Methylene donor | 6 |
| Sulfur | 6 |
| Vulcanization accelerator | 2.2 |

The types of raw materials used as indicated in Table 2 are described below.
  SBR: Styrene-butadiene rubber, Nipol 1502, available from ZEON CORPORATION
  NR: natural rubber, SIR20
  CB: Carbon black, SEAST V, available from Tokai Carbon Co., Ltd.
  Stearic acid: industrial stearic acid N, available from Chiba Fatty Acid
  Aroma oil: Desolex III available from Showa Shell Sekiyu K.K.

Zinc oxide: Zinc Oxide III, available from Seido Chemical Industry Co., Ltd.
Modified resorcin formaldehyde condensate: Sumikanol 620, available from Taoka Chemical Co., Ltd.
Methylene donor: modified etherified methylolmelamine, Sumikanol 507AP, available from Taoka Chemical Co., Ltd.
Sulfur: 5% oil-treated sulfur, available from Karuizawa Refinery Ltd.
Vulcanization accelerator: Di-2-benzothiazolyl disulfide, NOCCELER-DM, available from Ouchi Shinko Chemical Industrial Co., Ltd.

TABLE 3

|  |  | Comparative Example 1 | Comparative Example 2 | Example 1 | Example 2 |
|---|---|---|---|---|---|
| Film thickness | mm | 0.15 | 0.15 | 0.15 | 0.15 |
| Inner rubber sheet thickness | mm | 1.0 | 1.0 | 1.0 | 1.0 |
| Outer rubber sheet thickness | mm | 1.0 | 1.0 | 1.0 | 1.0 |
| End structure of laminated body |  | Perpendicular | Inclination surface | Inclination surface (FIG. 1) | Step-like shape (FIG. 4) |
| Angle at winding starting end | ° | 0 | −20 | 20 | 20 |
| Angle at winding finishing end | ° | 0 | −20 | 20 | 20 |
| length L | mm | 20 | 20 | 20 | 20 |
| Method for forming end surface |  | — | Cutter blade (Room temperature) | Cutter blade (Room temperature) | — |
| State of splice portion |  | 1 | 1 | 4 | 4 |

|  |  | Example 3 | Example 4 | Example 5 | Example 6 |
|---|---|---|---|---|---|
| Film thickness | mm | 0.15 | 0.15 | 0.15 | 0.03 |
| Inner rubber sheet thickness | mm | 1.0 | 1.0 | 1.0 | 1.0 |
| Outer rubber sheet thickness | mm | 1.0 | 1.0 | 1.0 | 1.0 |
| End structure of laminated body |  | Inclination surface (FIG. 1) | Inclination surface (FIG. 1) | Inclination surface (FIG. 1) | Inclination surface (FIG. 1) |
| Angle at winding starting end | ° | 20 | 70 | 70 | 20 |
| Angle at winding finishing end | ° | 0 | 70 | 70 | 20 |
| Length L | mm | 20 | 20 | 5 | 20 |
| Method for forming end surface |  | Cutter blade (Room temperature) | Cutter blade (Room temperature) | Cutter blade (Room temperature) | Cutter blade (Room temperature) |
| State of splice portion |  | 3 | 4 | 3 | 4 |

TABLE 3-continued

|  |  | Example 7 | Example 8 | Example 9 | Example 10 |
|---|---|---|---|---|---|
| Film thickness | mm | 0.03 | 0.03 | 0.03 | 0.03 |
| Inner rubber sheet thickness | mm | 0.2 | 1.0 | 0.2 | 0.2 |
| Outer rubber sheet thickness | mm | 1.0 | 0.2 | 0.2 | 0.2 |
| End structure of laminated body |  | Inclination surface (FIG. 1) | Inclination surface (FIG. 1) | Inclination surface (FIG. 1) | Inclination surface (FIG. 1) |
| Angle at winding starting end | ° | 20 | 20 | 20 | 20 |
| Angle at winding finishing end | ° | 20 | 20 | 20 | 20 |
| Length L | mm | 20 | 20 | 20 | 20 |
| Method for forming end surface |  | Cutter blade (Room temperature) | Cutter blade (Room temperature) | Cutter blade (Room temperature) | Cutter blade (100° C.) |
| State of splice portion |  | 4 | 4 | 4 | 5 |

As apparent from Table 3, with the pneumatic tire in each of Examples 1 to 10 in which the appropriate layer thickness and the appropriate end structure are employed, flotation and rugosity of each layer at the splice portion were able to be prevented. In contrast, in Comparative Examples 1 and 2, the ends of the film being a starting point of peeling were not able to be covered with the rubber sheets. As a result, flotation was caused at the splice portion.

The invention claimed is:
1. A method for manufacturing a pneumatic tire, comprising: a splice process of winding a laminated body around an outer circumference of a tire forming drum and bonding a winding starting end and a winding finishing end of the laminated body with each other, the laminated body having a trilayer structure comprising:
a film containing, as a main component, a thermoplastic resin or a thermoplastic elastomer composition containing a mixture of a thermoplastic resin and an elastomer; and
a pair of rubber sheets laminated on both surfaces of the film,
wherein, on the tire forming drum, the pair of rubber sheets comprises an inner rubber sheet being a layer on a side of the tire forming drum with respect to the film and an outer rubber sheet being a layer arranged on a side opposite to the tire forming drum with respect to the film,
an end of the inner rubber sheet at the winding starting end is positioned on a side opposite to a winding direction of the laminated body with respect to an end of the film, and an end of the outer rubber sheet at the winding starting end is positioned on a side of the winding direction of the laminated body with respect to the end of the film,
an outer surface of the outer rubber sheet at the winding starting end and an inner surface of the inner rubber sheet at the winding finishing end are brought into contact with each other by overlapping and bonding the winding starting end and the winding finishing end of the laminated body with each other, the film has a thickness of from 0.03 mm to 0.15 mm, each of the pair of rubber sheets has a thickness of from 0.2 mm to 1.0 mm, an angle formed by a straight line, which connects the end of the inner rubber sheet at the winding starting end to the end of the outer rubber sheet at the winding starting end, with respect to a direction perpendicular to an outer surface of the tire forming drum is from 20° to 55°, an angle formed by the end of the inner rubber sheet is parallel to the direction perpendicular to the outer surface of the tire forming drum, an angle formed by the end of the outer rubber sheet is parallel to the direction perpendicular to the outer surface of the tire forming drum, and the end of the film is positioned between than the end of the outer rubber sheet and the inner rubber sheet in the winding direction.

2. The method for manufacturing a pneumatic tire according to claim 1, wherein an end of the outer rubber sheet at the winding finishing end is positioned on the side of the winding direction of the laminated body with respect to the end of the film, and an end of the inner rubber sheet at the winding finishing end is at a same position as the end of the film or is positioned on the side opposite to the winding direction of the laminated body with respect to the end of the film.

3. The method for manufacturing a pneumatic tire according to claim 1, wherein a length of a portion in which the outer surface of the outer rubber sheet at the winding starting end and the inner surface of the inner rubber sheet at the winding finishing end are brought into contact with each other is from 5 mm to 20 mm.

4. The method for manufacturing a pneumatic tire according to claim 1, wherein the film contains nylon.

5. The method for manufacturing a pneumatic tire according to claim 1, further comprising a process of compression bonding the winding starting end and the winding finishing end overlapping with each other between the splice process and a vulcanization process.

6. The method for manufacturing a pneumatic tire according to claim 1, wherein the laminated body is an unvulcanized innerliner layer.

* * * * *